May 14, 1957 C. D. GIBSON 2,792,079
MATERIAL HANDLING APPARATUS
Filed Jan. 12, 1955 5 Sheets-Sheet 1

INVENTOR.
CHRISTIAN D. GIBSON
BY

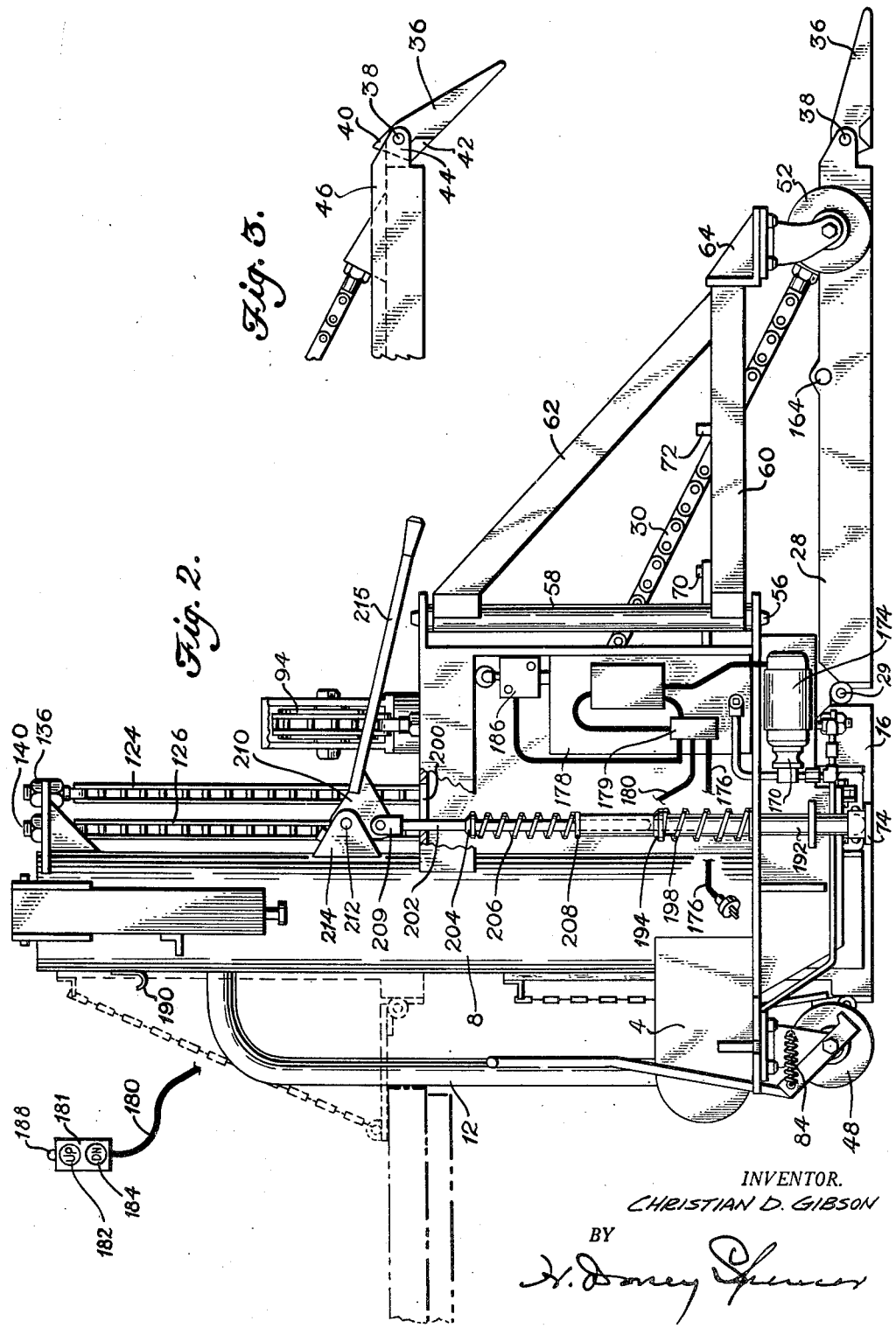

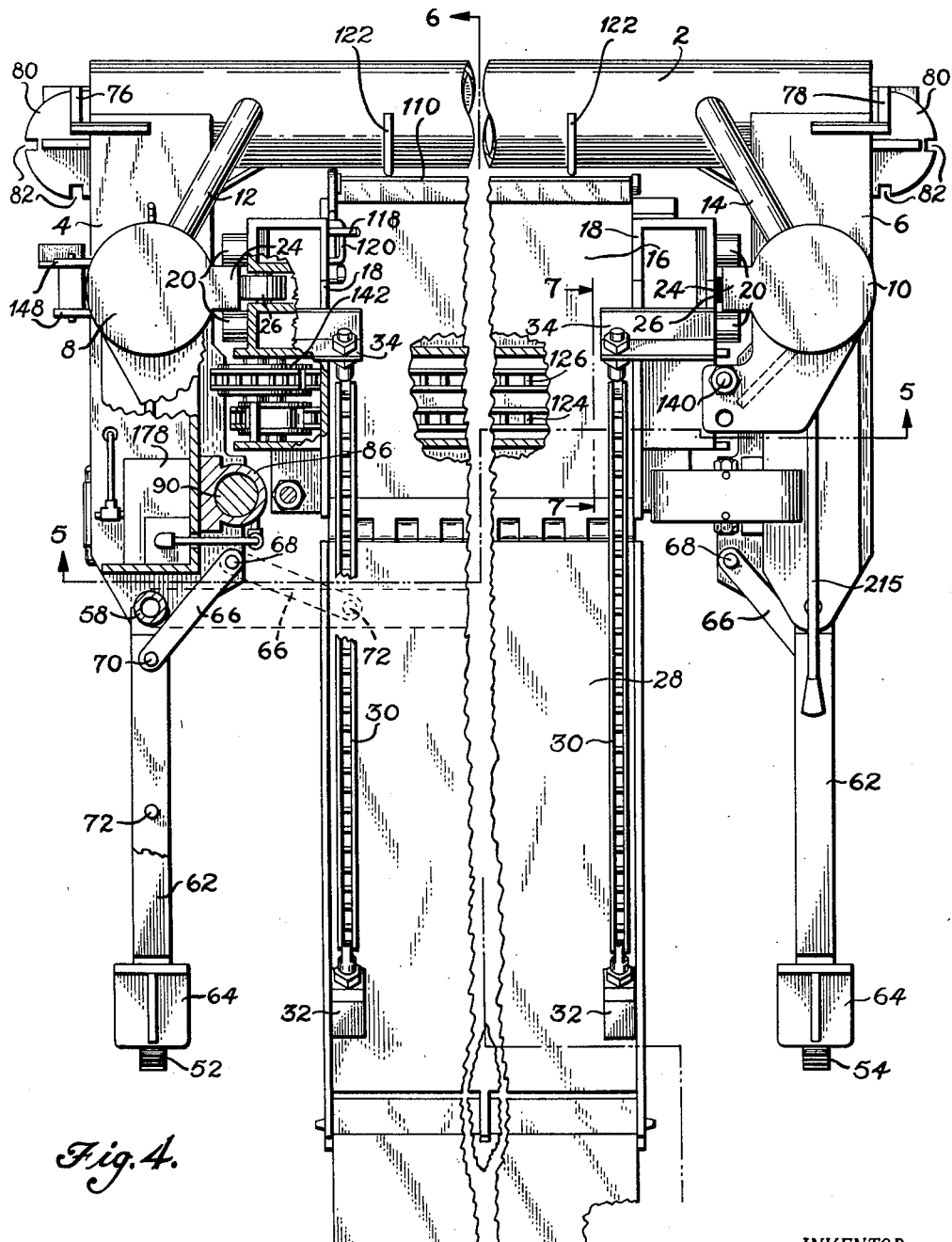

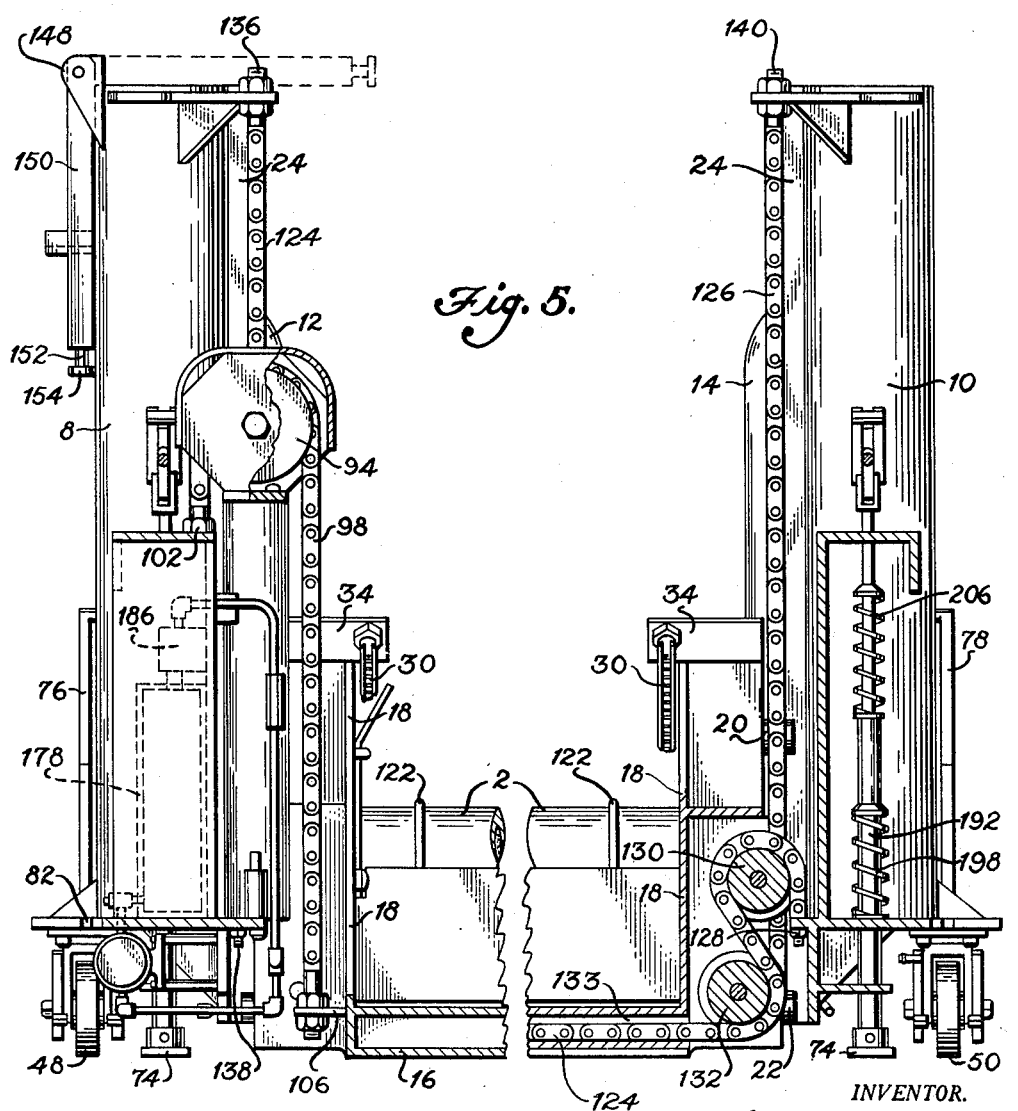

May 14, 1957 C. D. GIBSON 2,792,079
MATERIAL HANDLING APPARATUS
Filed Jan. 12, 1955 5 Sheets-Sheet 5
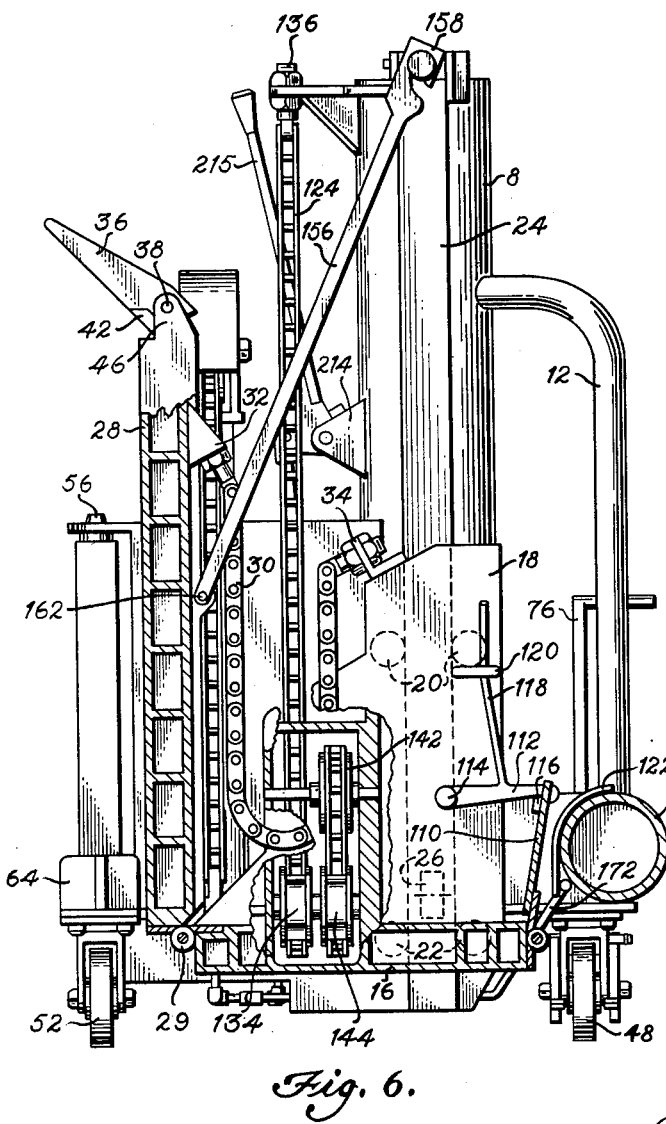
Fig. 6.  Fig. 7.  Fig. 8.
INVENTOR.
CHRISTIAN D. GIBSON
BY
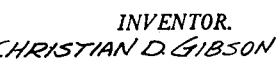

United States Patent Office 2,792,079
Patented May 14, 1957

2,792,079

MATERIAL HANDLING APPARATUS

Christian D. Gibson, Greene, N. Y., assignor to The Raymond Corporation, Greene, N. Y., a corporation of New York Application January 12, 1955, Serial No. 481,319

7 Claims. (Cl. 187—9)

This invention relates to material handling apparatus and more particularly to apparatus designed to facilitate the loading and unloading of goods-carrying vehicles, such as trucks, trailers, railway freight cars, etc., in places where suitable built-in docks or platforms are not provided.

When a railway freight car, a truck, a trailer or other over-the-road goods-carrying vehicle is to be loaded or unloaded at a point where a receiving or dispatching dock or platform of approximately the height of the car or truck body floor has not been provided, difficulty is naturally experienced, especially with heavy load units or with materials requiring careful handling, in effecting the loading or unloading of the vehicle. Moreover, situations often arise in which it is desired to load or unload a vehicle in places where no built-in dock or platform of the appropriate height is located. To meet such situations elevating platforms or docks have been designed but, for the most part, where such platforms or docks have been designed to handle loads or load units of substantial weight and/or dimensions, the elevating dock or platform structure has been so bulky as to require a practically fixed location as well as considerable floor area for its installation. Furthermore, many existing built-in docks or platforms, which are located at heights suitable for convenient loading or unloading of freight cars, trucks or other over-the-road vehicles, are at different levels from the factory or warehouse floors and therefore require space-wasting ramps to connect the docks or platforms with the warehouse or factory floors.

The present invention has for its general aim to provide an elevatable platform or dock, designed to handle loads of considerable weight and/or bulk, which can easily and quickly be placed in loading or unloading relation to a goods-carrying vehicle in almost any location, can easily and quickly be moved from one loading or unloading position to another and can easily and quickly be folded into such dimensions as either to permit its temporary storage in a comparatively small space or to permit its movement through a standard warehouse or factory door from one point of use to another. The invention further aims to provide an elevatable platform or dock for the purposes aforementioned in which there are no obstructions above the transfer dock or platform surface, whereby the operator is free to ride up and down with the dock or platform, together with the load thereon, and to move across the platform between the receiving and discharging positions without any interference from overhanging parts of the structure.

An important feature of the invention is the mounting of the elevatable dock or platform in the supporting frame in such manner that the dock or platform may be lowered completely to the floor and the provision of a platform of such rugged construction that its overall thickness may be comparatively small, whereby its load-receiving or top surface may be only a short distance above the floor in its lowered position, thus making possible the use of a low, short ramp on its rear end. Another important feature of the invention is the hinged mounting of the aforesaid ramp on the rear end of the platform in such manner that, as the platform rises, the ramp rocks into a position to present a stop in the way of movement of a transfer truck rearwardly off the platform. Still another important feature of the invention is the provision of a hinged extension of the platform at its front end which serves two purposes, namely, when the platform is elevated it serves as a bridge between the platform and the floor of the car or truck which is being loaded or unloaded, and, when the platform is being lowered or is in its lowered position, this front extension is latched in upright position to act as a front stop, provision being made for automatic latching of the front platform extension in its stop position as the platform is being lowered.

Other features of the invention are the arrangement of the operational control switch so that the operator may conveniently control the operation of the elevatable dock or platform either when standing thereon or when standing on the floor; the provision of a frame for the apparatus in which the only structural cross-connection is in the base and also in front of the platform when in its lowered position; the provision of a horizontally hinged, vertically foldable extension of the basic platform rearwardly of the main frame structure and the provision of vertically hinged outriggers on the main frame to provide stability for the aforementioned platform extension, the outriggers being arranged to be swung about their vertical hinges toward each other and into folded position behind the folded rear extension of the platform, thus collapsing the entire structure into a compact easily maneuverable form for moving; the provision of swivel-mounted supporting wheels upon both the base frame and the outriggers; the provision of a steering and draft handle for at least one of the swivel-mounted wheels and of means for locking another of said swivels against turning, in order to facilitate steering when the portable platform or dock is being moved from one location to another; the provision of means for anchoring the apparatus against movement over the floor when it is in operative loading or unloading position; the provision for insuring the maintenance of the load supporting surface of the dock or platform in horizontal parallelism throughout its elevating and lowering movements; the novel linkage arrangement for effecting the folding and unfolding of the rear platform extension by the platform lowering and elevating mechanism and the novel flexible struts which support the rear platform extension when in operative position and permit its folding when desired.

Other objects, important features and advantages of the invention, to which attention has not specifically been directed hereinabove, will appear hereinafter when the following description and claims are considered in connection with the accompanying drawings, in which—

Figure 2 is a side elevation of the apparatus shown in Figure 1 but showing, in dotted lines at the left, the operation of the bridging extension at the front of the platform when the platform is elevated;

Figure 3 is a detail view showing the construction and the position of the hinged ramp at the rear end of the elevatable platform when it is raised from the floor;

Figure 4 is a plan view of the apparatus, with the middle part broken away to permit showing the elements of the apparatus on a larger scale, other parts being also broken away or sectioned to show elements otherwise concealed;

Figure 5 is a vertical section on the line 5—5 of Figure 4;

Figure 6 is a vertical section on the line 6—6 of Figure 4 but with the elevatable platform or dock and the outriggers in their folded positions;

Figure 7 is a sectional detail on the line 7—7 of Figure 4, showing elements of the platform leveling mechanism, and Figure 8 shows a modification of the platform extension folding linkage.

Figure 1:
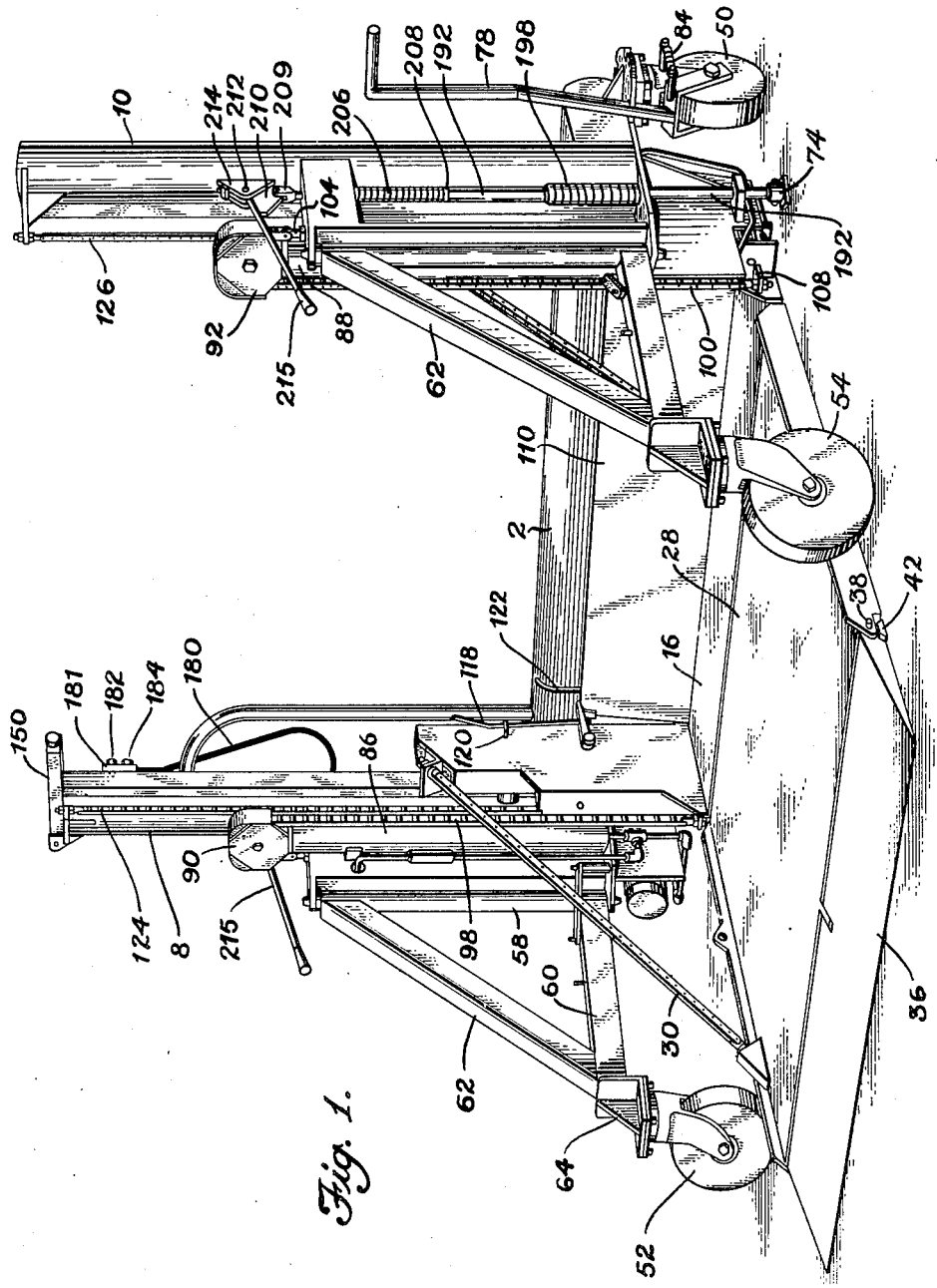
Figure 1 is a perspective view of a portable dock or platform having the present invention embodied therein.

Since the portable elevating dock or load transfer platform of the present invention is intended to be used in operations where the loads to be carried by it may run from 4000 lbs. to 6000 lbs. or even considerably more, it is important that the apparatus be of rugged construction, especially since it is important that the space above the elevatable platform be unobstructed to permit free movement of the operator thereover, together with the material to be loaded or unloaded. To this end, in the illustrative embodiment of the invention, the base frame of the apparatus comprises a strong transverse member 2 of tubular stock, to which are welded, near its ends, rearward rigid extensions 4 and 6 from which rise sturdy tubular uprights 8 and 10. An incidental reinforcement of the rigidity of the connection between the uprights 8 and 10 and the transverse member 2 is effected by the spotting rods 12 and 14 which extend between the respective uprights 8 and 10 and the transverse member 2 and are welded thereto as shown. The spotting rods 12 and 14 are so shaped and located, as shown, that they will engage the body floor end or edge of a truck, car or trailer to be loaded or unloaded and locate or spot the apparatus in proper transfer relation thereto.

The offsetting of the uprights 8 and 10 to the rear of the transverse member 2 is sufficient to permit the basic platform structure 16, which has guiding and stabilizing engagement with said uprights at its two sides, to move completely down to the floor behind said transverse member 2. The guiding and stabilizing engagement of the basic platform 16 with the uprights 8 and 10 is brought about by providing the platform 16 at its two sides with upwardly extending arms 18, each having mounted thereon upper and lower pairs of rollers 20 and 22 embracing guide ribs 24 on the inner faces of the uprights 8 and 10. Each arm 18 also has mounted thereon a thrust roller 26 engaging the inner face of the adjacent guide rib 24 to prevent lateral sway of the platform 16 and the parts connected thereto.

As hereinabove suggested, the basic platform 16, which is guided in its elevating and lowering movements by engagement of the rollers 20, 22 and 26 with the ribs 24 on the uprights, and to which the hydraulic lifting means hereinafter described are connected, preferably has a substantial rearward extension 28 to provide ample load supporting and transfer surface for the purposes of the invention. To permit folding into the vertical position shown in Figure 6, the extension 28 is hinged to the rear end of the basic platform 16, as, for example, by means of a piano type hinge 29. To insure adequate support for the extension 28, flexible struts 30 are provided, each connected at one end to a bracket 32 on the appropriate side of the extension 28 and, at its other end, to a bracket 34 on a side arm 18 of the basic platform 16.

As shown in section in Figure 6, both the basic platform 16 and its extension 28 are formed of upper and lower plates reinforced and united by transverse strips welded edgewise to the respective plates to form integral structures of high rigidity which, for the purposes of this invention, need not have great thickness. For example, the load-receiving surface of the entire platform, when lowered to the floor, may be only 2¼" above the surface of the floor, thus permitting the use of a short ramp of comparatively low inclination for easy running of loads on or off the platform. Such a ramp is shown at 36, hinged at 38 to the rear end of the platform extension 28. This hinging, which may also be of the piano type permits the ramp to tilt into the position shown in Figure 3 when the platform 28 is lifted from the floor. It will be seen that the hinge 38 is so located that the ramp 36, when tilted, presents a stop edge 40 in position to present a barrier to backward movement off the platform of a skid or pallet truck, dolly or other material handling vehicle while the platform is above the floor. The ramp 36 is preferably provided with stops 42 which engage the under side of the hinge-receiving extensions 44 of the side bars 46 on the sides of the extension 28 of the platform, thereby limiting the tilting of the ramp 36.

To facilitate convenient movement of the apparatus from one loading or unloading position to another or from a storage location to a use location, the apparatus is supported upon four swivel-mounted wheels 48, 50, 52, 54, two of which are mounted upon foldable outriggers, now to be described. It will be apparent that extending the part 28 of the platform so far behind the main frame structure in which the basic platform 16 is located presents a problem in stability when the entire platform, 16, 28, is lifted with a substantial load thereon. To meet this, while providing collapsibility of the apparatus for convenient moving, the main frame is extended rearwardly on both sides to points somewhat behind the hinge connection between the platform parts 16, 28, and vertical hinge pins 56 are provided upon which are mounted bracket-like outriggers, as shown.

These outriggers comprise each a tubular bearing portion 58, turning on the pin 56, a horizontal arm 60 and an inclined brace member 62. At its rear end each horizontal arm 60 has welded thereon a bracket 64 on which one of the swivel-mounted supporting wheels 52 or 54 is carried. It will be seen that the horizontal axes of the wheels 52 and 54 are offset sufficiently from the vertical swivel axes to provide the desired caster lead so that these wheels will follow the movements of whichever base supporting wheel 48 or 50 is used for steering the apparatus over the floor, either in its operative condition or in its folded condition. It will be seen that these outriggers, which straddle the platform extension 28 when in use, practically insure that any load being handled by the apparatus will have its vertically projected center of gravity well within the wheel base of the structure as a whole. Moreover these outriggers provide a strong stabilizing support for the elevatable dock or platform without markedly increasing the bulk of the basic structure.

When in the position shown in Figures 1, 2, and 4, the outriggers are locked in this position by locking bars 66 provided near their ends with openings to receive pins 68 and 70, the pins 68 being fixed upon the main frame structure and the pins 70 being fixed upon the horizontal arms 60 of the respective outriggers. As may be seen in dotted lines in Figure 4, a second pin 72 is fixed upon the arm 60 of each outrigger to be received in the rearmost opening in the associated locking bar 66 when the outriggers are folded in behind the vertically folded platform extension 28, thus locking the outriggers in this position. The parts are shown in their folded relations in Figure 6 of the drawings.

As hereinabove pointed out the apparatus can be moved over the floor on its supporting wheels either in its folded condition or in its unfolded operative condition, assuming the platform is not resting on the floor and that the floor locks 74 are in their raised positions. It will be seen that the wheels 48 and 50 are mounted upon swivels the vertical axes of which intersect the horizontal axes of turning of the wheels 48 and 50, respectively, so that these wheels have no "caster lead" and are therefore better suited for steering. It will also be seen that either the wheel 48 or the wheel 50 may be used for steering and that they are provided respectively with steering and draft handles 76 and 78, each having a yoke embracing the bearing yoke of the associated wheel. The brackets 80 which carry the swivel mountings for the wheels 48 and 50 include disk-like parts having in their edges notches 82 into any one of which the stem part of the steering and draft handle may enter while the rear part of the extension is held by the rod 156 and swings in with the rod 156 toward the uprights 8 and 10. This folding movement will continue, as the basic platform 16 is lowered by the hydraulic release, until the parts are in the position shown in Figure 6.

After the extension 28 has been brought into the folded position shown in Figure 6 in the manner just described, the two outriggers may be swung into position behind the folded extension 28, as also shown in Figure 6, and then locked in this position by the locking bars 66. The compact structure thus produced, with caster wheels 52 and 54 now quite near each other, can easily be steered over the floor either by the wheel 48 or by the wheel 50, using the steering and draft handle associated with the steering wheel selected. The reduced front to back dimension of the apparatus when folded, which, in a commercial embodiment, is only 35″, permits the easy movement of the folded apparatus through ordinary factory or warehouse doors.

The control of the operations of the apparatus, that is, control of the lifting and lowering operations of the hydraulic mechanism, is so arranged, as hereinabove indicated, that the operator may conveniently effect such control from any position on the platform or from a position on the floor alongside the apparatus. The cylinders 86 and 88 are interconnected to be operated simultaneously and equally from the same pump 170, the conduit 172 for the hydraulic cross-connection between the cylinders 86 and 88 extending from one side to the other on (or through) the transverse base member 2 out of range of the movements of the platform 16.

As shown, the pump 170 is driven by an electric motor 174 having a power cable 176 of sufficient length to plug into any convenient standard factory or warehouse outlet. The pump 170, motor 174 and a suitable reservoir 178 for hydraulic liquid may all be mounted on the extension of the frame behind the upright 8.

The power cable 176 goes into a terminal box 179 from which extends a switch cable 180 having at its end a push button box 181 in which are mounted two push buttons, one of which, 182, marked "up," closes the motor operating circuit when pressed. The other push button 184 controls a circuit which operates a release valve in the casing 186 to relieve the hydraulic lifting pressure in the cylinders 86 and 88 to permit the platform to lower, the lowering speed being, of course, hydraulically retarded to the desired extent. As will be seen, the switch cable 180 is long enough so that the operator may control the operations of the hydraulic mechanism from any position on the platform 16, 28, or from any convenient position on the floor alongside the apparatus. The switch box 181 is provided with a ring 188 by which it may be hung from a hook 190 on the upright 8 when not in use.

Two floor locks 74 are provided to prevent movement of the apparatus out of loading and unloading position when in use. These floor locks, as shown in Figure 5, comprise each a floor-engaging foot 74 on the lower end of a hollow rod 192, vertically slidable in the frame and having fixed thereon a collar 194 resting on a spring 198 which tends to hold the foot 74 out of engagement with the floor. Sliding loosely in the hollow rod 192 and swingable slightly laterally in a slot 200 in the frame is a second rod 202 forming one link of a floor lock operating toggle. The rod 202 has thereon a collar 204 resting on a spring 206 surrounding said rod 202 and supported at its other end on a flange 208 on the upper end of the hollow rod 192. The rod 202 is provided at its upper end with a fork or yoke 209 having pivotal connection with a triangular toggle member 210 having its upper pivot 212 in a bracket 214 on the associated upright 8 or 10. A handle 215 connected to the triangular toggle link 210 provides for easy straightening of the toggle made up of the rod 202 and the member 210, thus causing the rod 202 to telescope into the hollow rod 192 against the resistance of the spring 206 until the compression of the spring 206 overcomes the resistance of spring 198 to depression of the foot 74 into engagement with the floor. The pressure thus exerted upon the floor, while not enough to lift the supporting wheels 48, 50, 52 and 54, or any of them, from the floor, is sufficient to provide anchoring friction against movement of the apparatus over the floor while it is being used for its intended purposes.

Referring again to the description hereinabove of the power folding of the platform extension 28 about its hinged connection to the basic platform 16, in which a link or tilting rod 156 is connected at one end to the neck 152 of the bar 150 and at its other end to the side bar of the platform extension, it has been found in practice that greater facility in connection, since it requires less careful adjustment of the platform height, can be obtained by substituting for the one-piece link or rod 156 the chain 216, having a hook 217 at each end, as shown in Figure 8 of the drawings.

What is claimed as new is:

1. Material handling apparatus having, in combination, a frame comprising a transverse base member, uprights rearwardly offset from said base member but rigidly connected thereto near its ends, an elevatable platform located between said uprights and behind said base member and having guiding and stabilizing engagement with said uprights at its sides, said platform being movable between a position in which it may rest upon the floor behind said base member and the desired position of elevation, hydraulic jacks mounted on said frame and connected to the respective sides of said platform to effect the raising and lowering movements thereof, the space above said platform between said uprights being unobstructed and said platform having a substantial extension behind the uprights, and outriggers extending rearwardly from the frame and alongside the two sides of the platform extension to provide stability for loads on the extended platform, the platform extension being connected thereto to swing about a horizontal hinge and the outriggers being connected to the frame to swing about vertical hinges toward each other, whereby both the platform extension and the outriggers can be folded into substantial parallelism to the plane of the uprights.

2. Material handling apparatus according to claim 1 in which the outriggers are supported on casters, the base frame is supported on swivel mounted wheels and means are provided for locking either of the base frame wheels in any one of a plurality of steering relations to the base frame.

3. Material handling apparatus according to claim 1 in which arms extending upwardly from the two sides of the platform carry guiding and stabilizing rollers, in which guides are provided on the inner faces of the uprights with which said rollers cooperate and in which flexible struts, extending from said upright arms to said platform extension, support said extension in foldable relation to said platform.

4. Material handling apparatus according to claim 1 in which a swingable link, connected at one end to an upright and at its other end to the foldable platform extension when partially elevated, serves to effect the folding of the extension toward the upright as the platform as a whole is again lowered.

5. Material handling apparatus according to claim 4 in which the connecting link is itself made up of chain links to permit the platform folding connection to be made when the platform is at different stages of elevation.

6. Material handling apparatus according to claim 2 in which each base supporting wheel swivel has a steering and draft handle connected thereto.

7. Material handling apparatus according to claim 6 in which each steering and draft handle constitutes an eleto lock the associated wheel against swiveling and at the same time lock it in a definite angular relation to the frame structure. It will be seen that there are three notches in each of the disk-like parts of the brackets 80, two of which, when either is engaged by the associated handle 76 or 78, lock the associated wheel 48 or 50 against swiveling or steering movement away from a direction of travel at right angles to the axis of the transverse member 2, and the other of which notches 82, when engaged by the associated handle, locks the associated wheel in such an angular relation to the transverse member 2 that it can roll only in a path parallel to the axis of the transverse member.

It will thus be seen that the wheel 48 or the wheel 50 or both can be used for steering the apparatus when moving it and that the wheel not used for steering can be locked by the associated handle against swiveling during such movement. To facilitate locking the wheels 48 and 50 against swiveling, a spring connects the yoke portion of each handle 76 and 78 to bearing yoke of the associated wheel, this spring acting constantly to urge the associated handle 76 or 78 into locking engagement with one of the notches 82. The springs 84 hold the stems of the handles 76 and 78 in locking position in one of the notches and upright at all times except when either is being used as a steering and draft handle. Of course both may be so used when two operators are engaged in moving the apparatus.

The hydraulic means for lifting and for controlling the lowering of the dock or platform 16, 28, comprise hydraulic jacks having cylinders 86 and 88 respectively located adjacent the two sides of the platform and fixed to the main frame. The cylinders 86 and 88 have plungers 90 and 92 therein which are provided at their upper ends with grooved pulleys 94 and 96 for chains 98 and 100, respectively connected at one end to anchorages 102 and 104 on the frame and, at the other end, to brackets 106 and 108 on the sides of the basic platform 16. The brackets 106 and 108 are preferably located near the hinge end of the platform 16.

The platform 16 has hinged thereto at its forward end a foldable bridging extension 110. This relatively short extension is long enough to provide a bridge between the platform 16 and the floor of the truck, trailer, railway car or other vehicle to be loaded or unloaded, when the spotting rods 12 and 14 have been moved with the apparatus into engagement with the edge of the floor of such vehicle. When not used as a bridge the extension 110 serves as a front stop to prevent movement of transfer truck or dolly off the front end of the platform 16 while the platform is being raised or lowered or is in its lowered position. In order that the extension 110 may serve as a stop, a latch 112 is provided to lock said extension in its upturned position, as shown in Figures 1, 4, 5 and 6. This latch, which is pivoted at 114 on one of the upstanding arms 18 of the basic platform 16, has a somewhat beveled nose which rides up the cam face of the keeper 116, welded to the side edge of the extension 110, when the extension is tilted into its upright position. A handle 118 on the latch 112, guided in a slot in the guide piece 120 welded to the arm 18, is in position for convenient grasp by the operator whenever he desires to release the latch 112, as when the platform has reached the level of the truck or other vehicle floor and it is desired to drop the extension 110 into bridging position.

From an inspection of the dotted line showing in Figure 2 it will be seen that as soon as the lowering of the platform begins the extension 110 begins to move toward its upright position. If the structure over which the extension 110 travels in the lowering operation is not such as to complete the movement of the extension 110 into its upright latched position, such completion and latching will take place when the extension engages the ribs 122 on the transverse base frame member 2.

Since the overall usable area of the platform is considerable, for example, 72″ by 72″ in a commercial embodiment, it may often happen that a load thereon is set off-center. To insure a constant level condition of the platform, even with off-center loads, during its lifting and lowering movements, or, in other words, movement in constant parallelism to its floor resting position, leveling mechanism has been provided, as hereinabove suggested. The illustrated leveling mechanism comprises two chains 124 and 126, each extending from a low anchor position on one side of the frame through a transverse passage in the basic platform 16 beneath its load surface to a high anchor position on the other side. The chain 124 has its low anchor (set against upward pull) at 128 and from there is passes over a grooved pulley 130, mounted on the adjacent upstanding side arm 18 of the platform 16, then under the pulley 132 which guides it into a passage 133 therefor between the upper and lower plates of the platform 16. As the chain 124 emerges from the other end of the passage 133 it engages the under side of a grooved pulley 134 and from this it extends upwardly to its high anchor (set against downward pull) at 136.

The chain 126 has its low anchor 138 (set against upward pull) on the frame on the other side of the platform 16 from the anchor 128 and its high anchor 140 (set against downward pull) on the opposite side of the frame from the anchor 136. This chain 126 passes over a pulley 142 on the upright arm 18 of the carriage 16 opposite the one on which the pulley 130 is mounted, then under a pulley 144 on this arm which guides it into the passage 133 through the platform 16, then under a pulley 146 at the other end of the passage 133 and up to its high anchor 140. It will be seen from the foregoing that any tendency of the platform 16, 28, to tilt under off-center loads will cause the pulleys, over and under which the chains 124 and 126 pass as the platform moves in either direction, to exert corrective pulls on the platform through the chains and thus offset any tendency to tilt.

As hereinabove pointed out the foldability of the apparatus for moving and for economy of storage space is an important feature of this invention. As is evident from the foregoing description, the platform extension 28 may be folded into vertical parallelism to the plane of the uprights 8 and 10, as shown in Figure 6, and the two outriggers may then be swung about their vertical hinges 56 toward each other until they are parallel to and behind the folded extension 28 and also in substantial alinement with each other, in which position they may be locked by the locking bars 66, as hereinabove described.

In order that the folding of the platform extension 28 into the position shown in Figure 6 may be effected by means of the platform operating hydraulic means, the novel means for bringing this about, now to be described, has been provided. Pivoted between bracket arms 148 on the upright 8, in such manner that it may be swung from a hanging position, as shown in Figure 4, to the position shown in Figures 1 and 6, is a bar 150 having a reduced neck 152 and retaining knob 154 at its free end. When the bar 150 is swung into the position shown in Figure 1, a rod 156, having at one end a hook 158, may have this hook hooked over the neck 152 of the bar 150. At its other end the rod 156 is provided with a pivot pin 162 adapted to be inserted into the pin opening 164 in the slight upward bulge of the side bar 46 of the extension 28.

To permit the tilting rod 156 to be thus connected at one end to the neck 152 of the bar 150 and at its other end into the opening 162 in the side bar bulge, the platform 16, 28, is raised by the hydraulic mechanism until the neck 152 and the opening 162 are so spaced that the connection can be made. After the connection has thus been made, the lowering of the basic platform 16 will carry with it the front hinged end of the extension 28 ment of the locking means for the associated base supporting wheel swivel.

References Cited in the file of this patent

UNITED STATES PATENTS

| 761,220 | Gorman et al. | May 31, 1904 |
| 1,613,901 | Parrish | Jan. 11, 1927 |
| 2,052,118 | Tear | Aug. 25, 1936 |
| 2,156,204 | Stolze | Apr. 25, 1939 |
| 2,498,299 | Rissler | Feb. 21, 1950 |
| 2,591,489 | Adams | Apr. 1, 1952 |
| 2,667,985 | Woughter | Feb. 2, 1954 |
| 2,678,746 | Gibson | May 18, 1954 |

FOREIGN PATENTS

| 59,475 | Norway | June 13, 1938 |
| 909,560 | Germany | Apr. 22, 1954 |